United States Patent
Dueckinghaus et al.

(10) Patent No.: US 9,255,639 B2
(45) Date of Patent: Feb. 9, 2016

(54) ELECTRONIC CONTROL FOR THE DRIVE UNIT OF A VEHICLE

(75) Inventors: Heinrich Dueckinghaus, Bielefeld (DE); Manfred Gersmann, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1705 days.

(21) Appl. No.: 12/145,053

(22) Filed: Jun. 24, 2008

(65) Prior Publication Data

US 2009/0005939 A1  Jan. 1, 2009

(30) Foreign Application Priority Data

Jun. 27, 2007  (DE) .......................... 10 2007 030 168

(51) Int. Cl.
| | |
|---|---|
| F16H 61/421 | (2010.01) |
| A01D 41/127 | (2006.01) |
| B60K 28/16 | (2006.01) |
| B60W 30/18 | (2012.01) |
| F16H 61/472 | (2010.01) |

(Continued)

(52) U.S. Cl.
CPC .......... *F16H 61/421* (2013.01); *A01D 41/1274* (2013.01); *B60K 28/165* (2013.01); *B60W 30/18172* (2013.01); *F16H 61/472* (2013.01); *B60W 2720/30* (2013.01); *B60Y 2200/222* (2013.01); *F16H 59/52* (2013.01); *F16H 2059/506* (2013.01)

(58) Field of Classification Search
CPC ..... F16H 61/421; F16H 61/472; F16H 59/52; F16H 2059/506; B60K 28/165; B60W 30/18172; B60W 2720/30; A01D 41/1274; B60Y 2200/222

USPC .............. 701/50, 70–75, 78, 81–84, 89–911; 303/112, 20, 22.1; 188/349, 152; 56/10.1, 10.2 R, 10.2 G, 10.2 H

See application file for complete search history.

(56) References Cited

U.S. PATENT DOCUMENTS 5,564,519 A * 10/1996 Katoh et al. ................... 180/243
5,715,664 A *  2/1998 Sallstrom et al. .................. 56/7

(Continued)

FOREIGN PATENT DOCUMENTS

| | | |
|---|---|---|
| DE | 199 21 856 | 11/2000 |
| EP | 1 232 682 | 8/2002 |
| EP | 1 350 658 | 10/2003 |

*Primary Examiner* — John Q Nguyen
*Assistant Examiner* — Michael Kerrigan
(74) *Attorney, Agent, or Firm* — Michael J. Striker

(57) ABSTRACT

In vehicles designed to pick up and process crops, drive units affect the ground drive, which is an all-wheel drive, which acts on all of the wheels and/or track roller unit in contact with the ground, electronic controls and actuators perform the control and regulation of the drive units, and control units that control the drive torque at the wheels are used to obtain good traction and minimal slippage of the wheels on the ground. To control the drive torques, sensors are used at particular points, the signals and data of which are processed by the control device in order to predetermine a torque or intake volume requirement. The preselection of torque in the control results in the intake volume of the hydraulic drive motor being regulated. By specifying the intake volume required, it is possible to obtain optimal traction at one or more drive wheels, and to prevent undesired slippage of any one drive wheel in advance.

9 Claims, 2 Drawing Sheets

(51) Int. Cl.
*F16H 59/52* (2006.01)
*F16H 59/50* (2006.01)

(56) References Cited

U.S. PATENT DOCUMENTS

| | | | |
|---|---|---|---|
| 5,995,895 A * | 11/1999 | Watt et al. | 701/50 |
| 6,073,428 A * | 6/2000 | Diekhans | 56/10.2 R |
| 6,397,571 B1 * | 6/2002 | Ehrecke | 56/10.2 R |
| 6,422,333 B1 * | 7/2002 | Kjær et al. | 180/197 |
| 6,865,870 B2 * | 3/2005 | Heisey | 56/10.2 G |
| 7,044,257 B2 * | 5/2006 | Kempf et al. | 180/305 |
| 7,121,374 B1 * | 10/2006 | Ho et al. | 180/242 |
| 7,246,670 B2 * | 7/2007 | Hayashi et al. | 180/6.2 |
| 7,748,489 B2 * | 7/2010 | Sheidler et al. | 180/308 |
| 7,798,272 B2 * | 9/2010 | Pruitt et al. | 180/197 |
| 2005/0183416 A1 * | 8/2005 | Hayashi et al. | 60/445 |
| 2005/0193733 A1 * | 9/2005 | Ochs | 60/606 |
| 2011/0040460 A1 * | 2/2011 | Velde et al. | 701/50 |

* cited by examiner

ELECTRONIC CONTROL FOR THE DRIVE UNIT OF A VEHICLE

CROSS-REFERENCE TO A RELATED APPLICATION

The invention described and claimed hereinbelow is also described in German Patent Application DE 10 2007 030 168.7 filed on Jun. 27, 2007. This German Patent Application, whose subject matter is incorporated here by reference, provides the basis for a claim of priority of invention under 35 U.S.C. 119(a)-(d).

BACKGROUND OF THE INVENTION

The present invention is based, in general, on the field of agriculture and the processing of harvested crops. Vehicles designed to pick up and process crops—self-propelled agricultural harvesting machines in particular—are used for this purpose. The self-propelled agricultural harvesting machines are typically combine harvesters, forage harvesters, and all types of lifters that are equipped with electronic control devices for drive units. Some of the drive units act on the ground drive, which is composed of an all-wheel drive that acts on all of the wheels, and/or a track roller unit in contact with the ground.

The front wheels of a harvesting machine may be composed of a track roller unit with two large guide wheels. The wheels are driven by a main engine, which is designed, e.g., as an internal combustion engine, by a hydraulic pump, and at least one hydraulic motor, which is connected with the hydraulic pump, converts the hydraulic energy into mechanical work, and drives at least one wheel that is engaged with the ground. Electronic controls and actuators are used to control and regulate the hydraulic motors, which, as drive units, drive front and rear wheels using a hydrodynamic transfer of force. Control units that control the drive torque at the wheels are used to obtain good traction and minimize the slippage of the wheels on the ground. Sensors that process the signals from the control devices are used at particular points in the self-propelled harvesting machine to control the drive torques.

Various systems are known from the related art for increasing the traction of vehicles and reducing the tire slip between the drive wheel and the ground.

One such system is an all-wheel drive, with which—in complete contrast to front-wheel drive or rear-wheel drive—the engine force of a vehicle acts on all wheels in contact with the ground, in order to ensure that the vehicle may travel across rough terrain at all. All-wheel drive increases traction by distributing the drive torques and improving driving stability, and it is adequately known from the related art. With vehicles with permanent all-wheel drive, engine power is transferred constantly to all four wheels, and differentials ensure that the rotational speed is fully equalized and that power is not lost. To prevent strain from occurring in the drive train, an additional central differential is installed between the front and rear axles. The disadvantage of this is that, if any single wheel or axle has inadequate traction or no traction, the amount of drive torque that may be transferred by this wheel or axle is limited. As a result, in the extreme case, the vehicle becomes unable to move under its own force.

Assistance in these cases is provided by a special transmission and an electronic control, referred to as VDC (vehicle dynamic control). The special transmission compensates for the unequal weight distribution between the axles of the agricultural machines by dividing the force between the front and rear axles at a ratio of, e.g., 35:65. The electronic control compares the wheel speeds and steering angle specified by the drive, to detect overcontrol or undercontrol and to modify the force distribution such that the vehicle retains a neutral self-steering effect.

Publication DE 199 21 856 A1 discloses a hydrostatic-mechanical all-wheel drive for multiple-axle vehicles that makes it possible to distribute the ground drive output to the driving axles with consideration for the traction that exists between the vehicle tires and the ground. The drive presented ensures automatic, stepless adjustment of the speed ratios, but it may also be supported via regulator intervention depending on the steering angle, thereby resulting in torque being distributed to the drive axles by changing the rotational speed ratios. Strain is thereby prevented, as described previously in the related art, even when driving through tight turns. Output is distributed such that wheel slip is kept the same between all driven wheels, even when the loads on the vehicle axles change.

The disadvantage of this drive system is that the control and regulating device measures only a few parameters of the vehicle. As a result, power distribution, which is carried out by adjusting the hydraulic motors, does not take place under all driving and harvesting conditions.

The aforementioned control and regulating device is referred to as ASR (anti-slip regulation) or TCS (traction control system), and is known from the related art. Anti-slip regulation ensures that the wheels do not spin when they are accelerated. When giving too much gas at start-up or if the terrain is poor and static friction is minimal—circumstances which occur very often in agriculture—one or more wheels may spin, and the vehicle becomes unstable. The spinning of one or more wheels on the ground is referred to as tire slip. To ensure a maximum transfer of friction force between the tires and the various ground conditions in fields, and in various weather conditions, ASR is used to prevent wheels from spinning and/or to prevent undercontrol and overcontrol of the vehicle. If there is a risk of serious slip of the drive wheels, the drive torque is regulated via targeted intervention by the braking system and/or engine management system.

The closed-loop control system, which receives its information, e.g., from the ABS wheel speed sensors, therefore ensures traction and driving stability during the acceleration phase on a straight path, even when driving around turns. ABS stands for "antilock braking system" and also improves the driving safety of agricultural vehicles. It functions mainly in certain situations of hard braking by regulating the braking pressure in short intervals to counteract the tendency of the wheels to lock up. ABS is also capable of controlling the braking behavior of each individual wheel in a nearly optimal manner. The ESP (electronic stability program) also prevents slip and the undercontrol or overcontrol of a vehicle using electronic sensors, the signals of which are evaluated and processed in a system, by braking individual wheels in a specific manner.

The system ascertains the driving behavior in this manner and intervenes when a deviation from the driver's information setting is determined. The change in steering angle is also taken into consideration. Hydraulic motors may be braked by changing the volumetric flow rate of the hydraulic fluid.

The ESP, ASR, and ABS control systems do not meet the requirements placed on drive wheels of motor vehicles, however, in particular on agricultural harvesting machines, for attaining optimal traction and limiting it such that tire slip may be adequately prevented under specific harvesting conditions.

Publication EP 1 350 658 B1 makes known a control device for an hydraulic all-wheel drive that controls actuators using signals generated by sensors (a speed sensor and a pressure sensor). The actuators influence two drivable axles or hydraulic motors assigned to the axles by changing the intake volume, in order to obtain optimal traction at the drive wheels. This type of control not only takes the aforementioned driving behavior into account, but also the load distribution on the front and rear axles when driving up or down hills, thereby making it possible to prevent the familiar "back-spin" effect. When the loads on the axles change when driving up or down hill, this is compensated for by changing the drive output at the wheels. The axle loads are not actually measured, however. Instead, the operating state of the hydraulic motor is ascertained via a pressure sensor, the signal of which contains information about the pressure difference between the inlet and outlet channels in the hydraulic motor, and via the speed sensor signal. Based on the signal from the pressure sensor, it may be determined whether the wheel is driving the vehicle, or whether the wheel is spinning. The disadvantage of this system is that the slip of one or more wheels is not detected at an early stage, and it cannot be counteracted until after slip has already occurred.

Publication EP 1 232 682 B1 describes an electronic engine control for an internal combustion engine. Performance curves for controlling the internal combustion engine are stored in the control. The performance curves contain information about engine output as a function of various parameters, e.g., engine speed, temperature, the drive of the attachments and devices, etc. According to the present invention, the control contains machine parameters of crop material-gathering devices. When a different crop material-gathering device is used, this is detected via sensors. A sensor may be a switch in the driver's cab, which the driver may operate. When a different crop material pick-up device is used, the performance curve of the internal combustion engine is changed in the engine control. The change to the performance curve results in the output of the internal combustion engine being regulated up or down. The performance of the internal combustion engine is therefore regulated depending on the front attachment that is used. The drive torque of the individual drive wheels at the hydraulic motors is not regulated, however.

SUMMARY OF THE INVENTION

The present invention is therefore based on the object of creating a control device of the type described initially that prevents the aforementioned disadvantages of the known controls described in the related art, and it provides a technical solution that makes it possible to limit the drive torque of the drive wheels such that the wheels and/or tires are prevented from slipping on the ground, thereby ensuring that the maximum possible amount of drive torque may be transferred. With self-propelled agricultural harvesting machines that have four drive wheels, the interplay of the individual drive wheels under different traction conditions is therefore very significant.

In keeping with these objects and which others which will become apparent hereinafter, one feature of the present invention recites, briefly stated, in an electronic control device (26) for a drive unit of a vehicle, in particular a self-propelled agricultural harvesting machine with all-wheel drive, which is composed of a main engine, a hydraulic pump and at least one hydraulic motor, which drives the at least one wheel that is engaged with the ground, wherein traction is optimized and slip is prevented at least one wheel by specifying the torque required at the hydraulic motor depending on the application.

To equip vehicles—self-propelled agricultural harvesting machines in particular—with an electronic control device for ground drives having the features of the present invention, it is provided according to the present invention that the torque required at the hydraulic motor be specified depending on the particular application, to optimize traction and prevent slip by at least one wheel. Advantageously, the torque applied at the hydraulic motor is adapted to changing harvesting conditions such that wheel slip or spin is reduced or even prevented. The amount of wheel torque required is advantageously determined by the particular application of the vehicle. "Application" refers to the equipment used on the vehicle, or the conditions under which it is used.

The control conditions made known in the related art, e.g., ASR, cannot limit slip until it occurs at a drive wheel to a measurable extent. By this time, however, the topsoil has already been damaged, when the harvesting machine is used to pick up crops in a field. The torque of the hydraulic motor that is produced depends on the speed. The speed, in turn, depends on the volumetric flow rate, the pressure supplied by the hydraulic pump, and on the intake volume, while the drive torque for the drive wheel produced by the hydraulic motor is determined by the load pressure and the intake volume. "Intake volume", in the context of the fluid technology of hydraulic motors, refers to the quantity of hydraulic fluid that the hydraulic motor consumes per revolution. The intake volume is variable with regulatable hydraulic motors of the type under discussion here. That is, the output provided by the hydraulic motor to the drive wheel is proportional to the intake volume, speed, and pressure difference. The product of the intake volume and speed is the volumetric flow rate. The pressure difference is the difference between the pressure of the hydraulic fluid flowing into the hydraulic pump and the pressure of the hydraulic fluid flowing out of the hydraulic pump. This results in a further inventive requirement, namely to determine the intake volume required at the hydraulic motor in an application-specific manner, since it is proportional to the torque requirement and the power output of the hydraulic motor.

The torque and intake volume required to obtain a maximum possible wheel torque at one or more wheels are determined based on additional data that has been measured and/or determined via sensor signals. The data and/or signals are registered in an inventive electronic control device, which evaluates the data and signals and, based thereon, calculates the intake volume required for the hydraulic motors. The sensor signals are obtained, e.g., from speed sensors located on the drive axles. The data are composed of machine parameters, which include static and dynamic machine parameters, because the devices on which the machine parameters are based primarily influence the wheel load and/or traction of the wheels. The devices are the static machine equipment, which is used to determine the wheel load-dependent machine parameters. The static machine equipment includes, e.g., the type of crop material pick-up device attached to the self-propelled harvesting machine; this information is supplied to the control device along with the model, equipment type, and working width, and, therefore, different machine parameters. The type of vehicle, the tires used, and the motors used to drive them are taken into account in the control device with the different machine parameters.

Different crop material pick-up devices obviously affect the wheel and axle load on the drive wheels, and therefore seriously affect the traction and slip behavior of the drive wheels. It is therefore provided according to the present invention that the wheel load of at least one hydrostatically driven wheel be determined indirectly, and that the axle or wheel torque be adjusted depending on the wheel load that was determined. Further static machine parameters, which are supplied to the control device as data for calculating the control of the intake volume requirement of the drive wheels, are additional weights, which result, e.g., from the different technical equipment attached to the rear of the harvesting machine. The type of crop material to be processed is also taken into account as a machine parameter, because there are differences between grass, corn, grain, and other types of crops in terms of the weight for the wheel load and the terrain characteristics.

When the agricultural machine is used, e.g., to harvest grass, on a dry field, or to cut low-lying grass, high forward-travel speeds with adequate tractive force are required. When harvesting corn, however, when the soil is heavy and moist, and/or when a crop material hauling trailer is attached to the vehicle, the full tractive force is required at a low forward-travel speed. These different application-dependent requirements on traction and, therefore, the hydraulic drive units, are taken into account in the inventive specification of intake volume by the control device. Basically, the static machine parameters of the machine equipment are determined, and they are incorporated in the control device program in order to calculate the amount of torque required. The static machine parameters may be changed manually in the control device program at any time by the driver accessing a menu item of the control system, thereby making it possible to optimize traction and reduce slip at any time.

Manual intervention by the driver in the control is not possible when ASR or ESP controls are used, however. All that can be done with these systems is to turn the controls completely on or off.

Advantageously, the dynamic machine parameters are also included in the control device program, thereby ensuring that the value for the specified intake volume may be calculated in a more targeted manner. The dynamic machine parameters and/or their variable mass on which they are based, the variable direction, inclination, and/or ground speed of the vehicle are measured, because they also affect the wheel and axle load and, therefore, the traction and slip of the wheels. The variable dynamic machine parameters are therefore also used, according to the present invention, to calculate the intake volume required, in order to obtain optimal traction at an individual driving wheel or at several driving wheels at any time, and to prevent slip of one or more driving wheels.

Variable dynamic machine parameters result, e.g., from the variable position of the crop material pick-up device, the ground speed, and the steering angle of the vehicle. The parameters of the vehicle inclination—as made known in publication EP 1 350 658—and the vehicle acceleration in the longitudinal and transverse directions—as known from the ASR system—are also taken into account in the control device. A further object of the present invention for ascertaining the axle load is to detect the variable fill level of the tank container and, with combine harvesters, the variable fill level of the grain tank, and to also take this information into account. The dynamic machine parameter of the oscillating position of the axle is also included in the control device program. A further embodiment of the present invention includes indirect determination of the wheel load, e.g., using a load sensor located in the swing-axle suspension.

These variable dynamic machine parameters are measured using sensors, the signals of which are processed in the electronic control device along with the data on the static machine parameters, and based on which the values for the required torque are determined. The intake volume required by the hydraulic drive motors is regulated based on the values of the torque requirement that are determined. That is, the torque requirement determined based on the static and dynamic machine parameters approximately corresponds to a specified performance curve for the hydraulic motor, similar to the performance curve for the internal combustion engine that is stored in a control device.

The specified performance curve for the hydraulic motor that is calculated based on the machine parameters depends on wheel load; it is used to adjust the drive torque by controlling the intake volume of at least one hydrostatically driven wheel, and it is preferably used with all drive wheels. The performance curve contains data that applies to the variable traction and slip situation of every individual drive wheel. If, e.g., the position of the crop material pick-up device changes, the load on the front and rear axles changes, thereby also resulting in a change, disadvantageously, to the traction, steering behavior and slip conditions at the drive wheels. To offset these disadvantageous changes, the torque applied at the drive motors is changed based on the dynamic machine parameters of the crop material pick-up device contained in the performance curve, according to the present invention.

The change in the torque results in an increase in the tractive force at the hydraulic drive motors of the front axle by changing the intake volume requirement, and it results in a decrease in the tractive force at the drive motors of the rear axle. In addition, the torque between the left and right drive motor changes when entering a turn. In this case, the intake volume delivered to the individual drive motors is controlled such that optimal traction occurs at the drive wheels, and undesired slip of an individual drive wheel that could occur due to the conditions for use that were detected is prevented in advance. Different weight distributions on the axles of the harvesting machine are therefore determined indirectly to specify the intake volume required for the hydraulic motors. The application-dependent specification takes place by distributing torque automatically—also known as controlled longitudinal differential—between the front and rear axles. The torque distribution may vary between 60 to 40 and 90 to 10, and preferably 80 to 20, depending on what type of equipment is installed on the machine.

In a simple embodiment of the present invention, only the torque requirement is controlled, according to the present invention, based on the crop material pick-up device being used. The operator may intervene manually in the control device using the control system in order to account for any slip at the wheels that he observed during use of the vehicle. Advantageously, and according to the present invention, the intake volume specified for every wheel or axle, and a requirement for the distribution of axle load may be changed, and the application-dependent torque requirement may be changed manually. The requirement for a wheel may therefore be acted upon with an offset value, which is then retained for every further application-specific torque requirement for this crop material pick-up device. Assistance is therefore advantageously provided, in particular, in cases of poor traction due to unusual terrain conditions.

In a special embodiment of the present invention, traction is measured using a slip sensor, the control device is accessed, and the required intake volume is automatically adjusted. A radar sensor is suited for this purpose, for instance, which measures the actual ground speed of the vehicle and, in combination with the wheel speeds, makes it possible to determine slip. By correcting the specified intake volume, and when the slip is known, further slip may be advantageously prevented from occurring.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
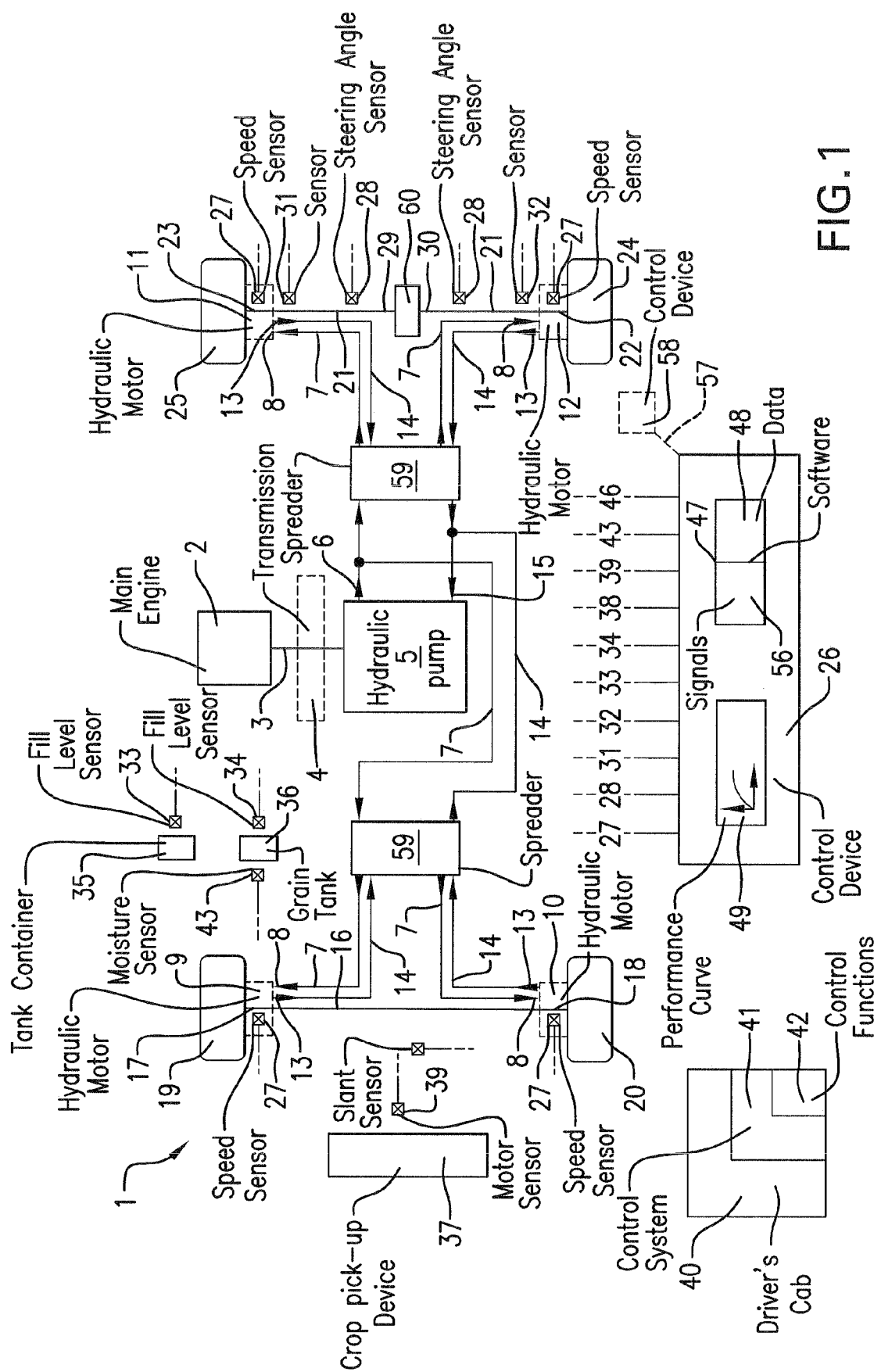
FIG. 1 is a schematic depiction of a drive system of an all-wheel drive vehicle, in particular a self-propelled agricultural harvesting machine with an electronic control device for the drive units.

FIG. 1 is a schematic depiction of an embodiment of a drive unit of an all-wheel drive vehicle, in particular a self-propelled agricultural harvesting machine 1 with an inventive electronic control device 26 for the hydraulic drive units of the ground drive. Harvesting machine 1 includes a (not-shown) frame or a self-supporting chassis, which rests on front wheels 19, 20 and rear wheels 24, 25, which are engaged with the ground. Rear wheels 24, 25 are typically located such that they are steerable, while front wheels 19, 20 have a larger tire diameter than do rear wheels 24, 25, and they carry most of the weight of the vehicle, in particular in the embodiment as a harvesting machine 1, e.g., a combine harvester. Front wheels 19, 20 of a harvesting machine 1 may also be a track roller unit (not shown), in which case a roller unit corresponds to a drive wheel 19, 20. Due to the different weight distribution of the vehicle on front axle 16 and rear axle 21, traction also differs at front drive wheels 19, 20 and rear drive wheels 24, 25. Traction is less critical for drive wheels 19, 20 mounted on front axle 16, due to their greater wheel load, than drive wheels 24, 25 mounted on rear steering axle 21.

The drive unit includes a main engine 2, which is an internal combustion engine, preferably a diesel engine, which drives various material processing and conveying devices. The drive unit drives the ground drive of harvesting machine 1. The ground drive is driven via a shaft 3 of main engine 2 to hydraulic pump 5, the fluid displacement of which converts mechanical power into hydraulic power (pressure×volumetric flow rate) using a tilt-box (see FIG. 2), which is controllable. The control of hydraulic pump 5 will not be discussed further here, because it is assumed to be known. A transmission 4 (shown as a dashed line) may be located between main engine 2 and hydraulic pump 5, as an alternative. Hydraulic pump 5 includes an outlet 6 and an inlet 15. Outlet 6 is connected—as the supply—via hydraulic lines 7 and a distributor 59 with inlet 8 of hydraulic motors 9, 10, 11, 12, while outlet 13 of hydraulic motors 9, 10, 11, 12 is connected—as the return—via hydraulic lines 14 with inlet 15 of hydraulic pump 5.

Two of the hydraulic motors 9, 10 are located on front axle 16, and each hydraulic motor 9, 10 is connected via a drive shaft 17, 18 with a front wheel 19, 20. The two hydraulic motors 11, 12 located on rear axle 21 are connected via a drive shaft 22, 23 with rear wheels 24, 25. Rear axle 21 is preferably a swing axle, which is designed as a rigid axle and accommodates rear wheels 24, 25. The rigid axle is located in the center, under the rear end of harvesting machine 1, and it is mounted to the machine frame using a bolt 60 oriented in the direction of travel. Bolt 60 makes it possible for axle 21 to oscillate transversely to the direction of travel, and it may be designed as a measuring bolt to determine the axle load.

A control device 26 is connected with a large number of sensors located in harvesting machine 1, in order to pick up their signals 56 and process them. The sensors monitor the changes in the dynamic machine parameters. Some of these sensors are speed sensors 27, which are located on drive shafts 17, 18, 22, 23, and which emit a pulse with each revolution of a drive shaft 17, 18, 22, 23, or several times per revolution. Sensors 28 that detect the current steering angle are located on rear axle 21, which is steerable in design. Rear axle 21 is divided into two parts and is designed as a swing axle 29, 30. Swing axles 29, 30 are equipped with sensors 31, 32 that control the oscillating position of axles 29, 30. A transverse and longitudinal inclination sensor 38 is located on rigid front axle 16, which delivers signals 56 for travel along a sloped hillside, or up or down hill. Further sensors 33, 34 measure the fill level of fuel tank container 35 and grain tank 36. A motion sensor 39 measures the motion, raising and lowering of a front attachment, e.g., a crop material pick-up device 37, and its signal 56 is taken into account as a dynamic machine parameter in control device 26.

Data 48 of the static machine parameters are also registered by control device 26; this takes place in a partially automated manner or via control functions 42 in control system 41 located in driver's cab 40 of harvesting machine 1. Data 48 of the static machine parameters are specified primarily depending on which machine equipment is used. The static machine equipment includes, e.g., the type of crop material pick-up device 37 attached to self-propelled harvesting machine 1; this information is automatically supplied to control device 26 along with the model, equipment and working width, and, therefore, different machine parameters. In a refinement of the present invention, a sensor, which is not shown here, may be installed on harvesting machine 1. The sensor automatically detects the presence of crop material pick-up device 37 used for harvesting and reports it to control device 26. Crop material pick-up device 37 may also be equipped with a separate electronics module, which identifies itself to control device 26, e.g., via a data bus connection. Various crop material pick-up devices 37 clearly determine the wheel and axle load on drive wheels 19, 20, 24, 25, and they affect the traction and slip behavior of drive wheels 19, 20, 24, 25. When a crop material pick-up device 37 is installed, e.g., if a pick-up (grass collector) is replaced with a corn header (corn pick-up), control device 26 automatically adjusts the torque requirements at hydraulic motors 9, 10, 11, 12.

The machine type of the vehicle and its engine type 2 are also taken into account in control device 26, together with different machine parameters, via the programming of software 47, before the vehicle is started up. Further static machine parameters, which are incorporated as data 48 in software 47 of control device 26, include additional weight, which results, e.g., due to the different types of technical equipment attached to the rear of harvesting machine 1, e.g., straw choppers and chaff spreaders. The machine parameter that is the type of crop material to be processed is also taken into account, because there are essential differences between grass, corn, and grain in terms of weight, which affects wheel load and traction. The moisture content of the crop material is also determined, using a moisture sensor 43.

The ground condition is also taken into account as a parameter during harvesting, i.e., whether the ground is moist, heavy, or hard and dry, for example. The machine operator may gauge the condition of the ground himself and enter it via the control system. The ground condition may also be ascertained using a learning routine in that the drive unit of the vehicle is driven with different torque requirements over a certain period of time, and the torque required to obtain good traction without slip is selected manually or automatically. Electronic control device 26 measures all further machine parameters for this torque requirement that was determined, then controls the torque requirement based on the value that was learned, according to the present invention and depending on the particular application.

Further machine parameters may be drawn from other control devices 58 installed in the vehicle and then incorporated in control device 26, so that they may be utilized to determine an optimal performance curve 49.

Based on the static and dynamic machine parameters that were ascertained, values for the torque requirement are calculated using control device 26, and a performance curve 49 for hydraulic motors 9, 10, 11, 12 is determined. Performance curve 49 is used to specify the intake volume for hydraulic motors 9, 10, 11, 12. The required intake volume is controlled by regulating the hydraulic adjusting motor or tilt-box 44 of hydraulic motors 9, 10, 11, 12. In some systems, the adjusting motors are regulated using tilt-boxes or swash plates. An adjusting unit 45 (see FIG. 2) is provided for adjusting tilt-box 44, which transfers the specified motion from control device 26 to tilt-box 44. Adjusting unit 45 is preferably an electromechanical actuator.

A sensor 46 detects the current position of adjusting unit 45, which is used to provide feedback to control device 26 and control a torque preselection and/or intake volume specification. Tilt-box 44 of hydraulic motors 9, 10, 11, 12 is therefore controlled with reference to the wheel load-dependent machine parameters that were measured and evaluated, based on performance curve 49 contained in control device 26, thereby resulting in an intake volume that may be regulated. Using control system 41 located in driver's cab 40, the operator may manually intervene in control device 26 and displace performance curve 49 and/or the automatically specified torque with an offset, for one or more hydraulic motors 9, 10, 11, 12. The displacement may take place via a control function 42, e.g., a rotary potentiometer. Performance curve 49 may be raised or lowered.

Figure 2:
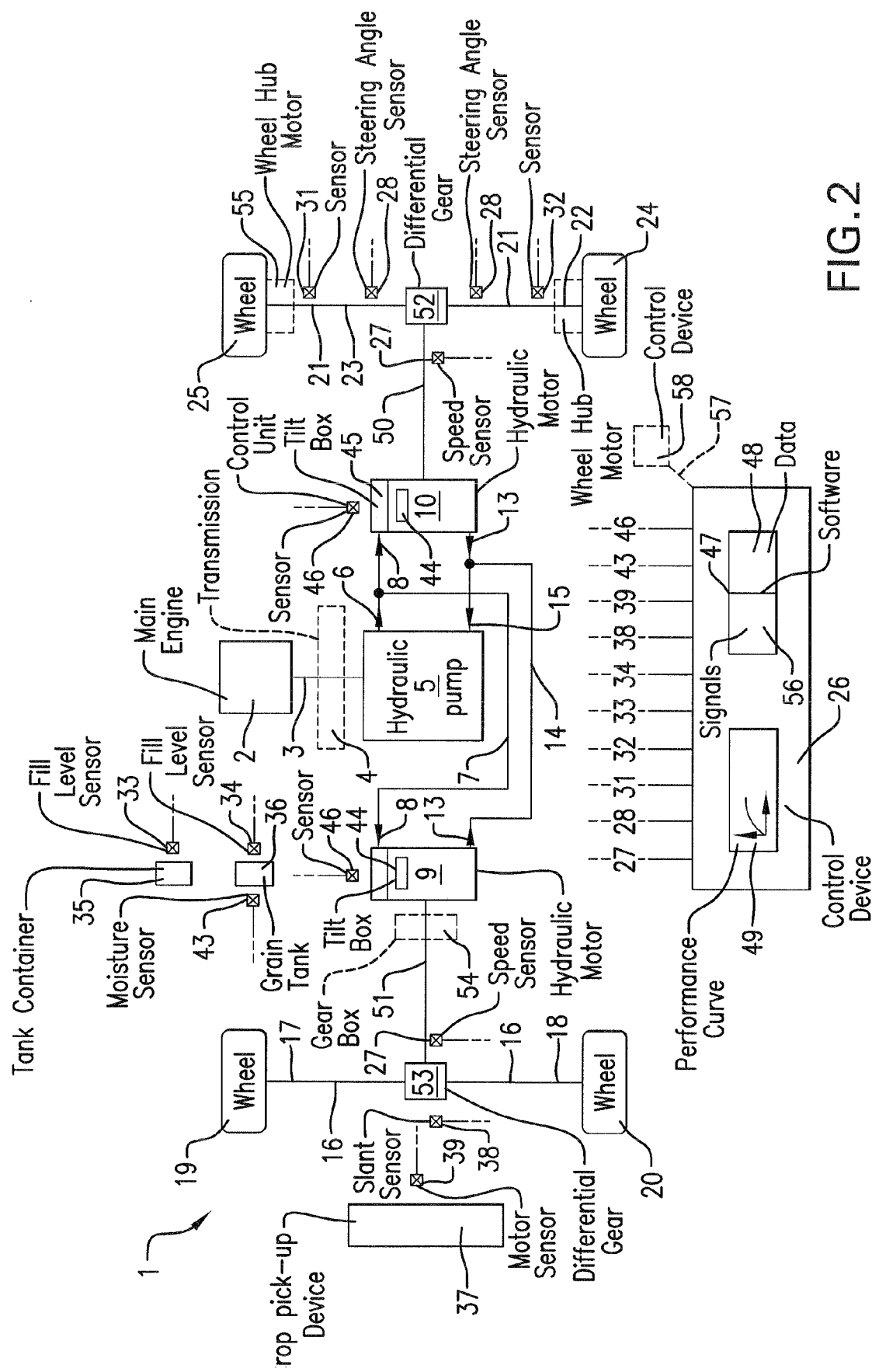
FIG. 2 is a perspective illustration of an inventive electronic control device in a further exemplary embodiment of a ground drive.

FIG. 2 is a perspective illustration of inventive electronic control device 26 in a further embodiment of a ground drive. Descriptions and details regarding the ground drive and control device 26 that are identical to those provided for FIG. 1 will not be repeated for FIG. 2. Elements that are the same are labelled with the same reference numerals. The main difference from the ground drive depicted in FIG. 1 is that the all-wheel ground drive shown in FIG. 2 includes only two hydraulic motors 9, 10, each of which drives a differential gear 52, 53 via a drive shaft 22, 23. First hydraulic motor 10 drives the two rear wheels 24, 25 via a first drive shaft 50 and a first self-locking differential gear 52.

Second hydraulic motor 9 drives the two front wheels 19, 20 via a second drive shaft 51 and a second self-locking differential gear 53. First hydraulic motor 10 may be switched on or off, so that the four-wheel drive feature may be switched on preferably only during the harvesting operation, when better traction is required, and it may be switched off during travel on the road. A multi-speed gearbox 54 (shown as a dashed line) with different, selectable gear stages may be provided between second hydraulic motor 9 and second differential gear 53. Multi-speed gearbox 54 may include a reverse gear, for driving in reverse. The further alternatives to driving in reverse will not be described in greater detail here. As an alternative, a hydraulic wheel hub motor 55 (shown as a dashed line) may be located at the rear of harvesting machine 1 in place of first hydraulic motor 10 and first differential gear 52 at rear drive wheels 25, 26 of rigid steering axle 21.

As shown in FIG. 1, control device 26 is connected with a large number of sensors, in order to measure the dynamic machine parameters. As shown in FIG. 1, control device 26 calculates—based on the sum of data 48 of static machine parameters and the sum of signals 56 from the sensors of the dynamic machine parameters—the torque required, based on which a performance curve 49 is calculated, which, in turn, is used to determine the intake volume required for hydraulic motors 9, 10. Using aforementioned inventive control device 28, it is possible to control the all-wheel function of self-propelled harvesting machines 1 with hydrostatically-driven drive wheels 19, 20, 24, 25 such that traction is provided for hydraulic motors 9, 10, 11, 12 that is always optimal for the particular application, and such that drive wheels 19, 20, 24, 25 may be prevented from slipping.

To prevent and detect slip, one option is to use one or more slip sensors (not shown), e.g., a wheel sensor, installed in the machine itself. The wheel sensors measure the actual ground speed of the vehicle and detect—in combination with the rotational speed of at least one wheel 19, 20, 24, 25—slip at at least one wheel 19, 20, 24, 25, or they control drive wheels 19, 20, 24, 25 directly and automatically intervene in control device 26 when slip occurs. The result of the intervention in control device 26 is that performance curve 49 is modified and the torque requirement is shifted. If slip occurs, the intake volume requirement is shifted downward briefly, thereby resulting in a reduction in wheel torque and, therefore slip. When drive wheels 19, 20, 24, 25 are engaged with the ground once more, the torque requirement is raised again. The radar sensors are therefore used by control device 26 to regulate drive motors 9, 10, 11, 12. The devices known from the related art, i.e., ABS, VDC, TCS, ASR, and ESP may also be incorporated, of course, in the electronic control for the drive unit of the vehicle that is equipped according to the present invention.

Hydraulic motor 9 is absent form a further, simplified embodiment, which is based on the principle depicted in FIG. 2. Harvesting machine 1 is driven hydraulically and directly at front axle 16 using differential gear 53, via a mechanical main drive 2, or via transmission 4 located between main engine 2 and differential gear 53 at front wheels 19, 20 or the driven guide wheels of a track roller unit. Rear wheels 24, 25, which are located on controlled rear axle 21, are driven according to the present invention by hydrostatic wheel hub motors 55, which are driven based on a predetermined intake volume. Rear wheels 24, 25 are preferably mounted on a rigid swing axle, which allows rear axle 21 to oscillate transversely to the direction of travel of harvesting machine 1.

It will be understood that each of the elements described above, or two or more together, may also find a useful application in other types of constructions differing from the types described above.

While the invention has been illustrated and described as embodied in an electronic control for the drive unit of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A vehicle with all-wheel drive, said vehicle comprising:
a main engine;
at least one hydraulic motor which drives at least one wheel engaged with a ground;
a hydraulic pump driven by the main engine in order to supply the at least one hydraulic motor at the at least one wheel with hydraulic fluid;
means for measuring dynamic machine parameters including means for measuring variable vehicle weight, means for measuring vehicle around speed and means for measuring vehicle direction;
an electronic control device for controlling the at least one hydraulic motor to optimize traction and prevent slip at the at least one wheel by specifying a maximum possible wheel torque required at the at least one hydraulic motor, depending on a particular application and harvesting conditions, before the slip occurs;
wherein the specified maximum wheel torque is calculated by determining an intake volume requirement at the at least one hydraulic motor from static machine parameters and the measured dynamic machine parameters, which intake volume requirement is proportional to the wheel torque required at the at least one hydraulic motor driving the at least one wheel; and
wherein the electronic control device uses calculated torque values to define a performance curve for the at least one hydraulic motor and uses the performance curve to specify the intake volume requirement at the at least one hydraulic motor driving the at least one wheel.

2. A vehicle as defined in claim 1, further comprising means for measuring said static machine parameters.

3. A vehicle as defined in claim 1, wherein the electronic control device evaluates data ascertained and/or signals from said means for measuring, thereby resulting in values for the torque determination.

4. A vehicle as defined in claim 1, wherein the performance curve is a wheel-load dependent performance curve and wherein the electronic control device uses the wheel-load dependent performance curve to adjust the drive torque by controlling the intake volume of the at least one wheel which is driven hydrostatically.

5. A vehicle as defined in claim 1, wherein the performance curve contains data that represent a variable traction and slip situation of every individual drive wheel.

6. A vehicle as defined in claim 1, wherein the control device indirectly determines a wheel load of the at least one wheel which is driven hydrostatically, and adjusts the wheel torque depending on the wheel load that was measured.

7. A vehicle as defined in claim 1, further comprising a control system used to intervene in the operation of the electronic control device and manually changing the performance curve, thereby resulting in an adjustment of the intake volume requirement.

8. A vehicle as defined in claim 1, further comprising at least one slip sensor for intervening in the operation of electronic control device and automatically adjusting the intake volume requirement.

9. A vehicle as defined in claim 1, wherein the electronic control device automatically adjusts the torque required at the hydraulic motor when a crop material pick-up device formed as a header is installed on the vehicle.

* * * * *